United States Patent
Lee et al.

(10) Patent No.: US 9,001,946 B2
(45) Date of Patent: Apr. 7, 2015

(54) METHOD OF RECEIVING DOWNLINK DATA, AND MACHINE TYPE COMMUNICATION DEVICE USING THE METHOD

(71) Applicant: Electronics and Telecommunications Research Institute, Daejeon (KR)

(72) Inventors: Jun Hwan Lee, Seoul (KR); Hee Sang Chung, Daejeon (KR); Il Gyu Kim, Chungbuk (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/904,604

(22) Filed: May 29, 2013

(65) Prior Publication Data

US 2014/0010335 A1  Jan. 9, 2014

(30) Foreign Application Priority Data

Jul. 3, 2012 (KR) ........................ 10-2012-0072145

(51) Int. Cl.
| | | |
|---|---|---|
| H04B 7/10 | (2006.01) | |
| H04L 1/02 | (2006.01) | |
| H04B 7/08 | (2006.01) | |
| H04W 4/00 | (2009.01) | |
| H04B 17/00 | (2006.01) | |

(52) U.S. Cl.
CPC ............. *H04B 7/0808* (2013.01); *H04W 4/005* (2013.01); *H04B 17/0057* (2013.01)

(58) Field of Classification Search
CPC ............. H04B 7/0808; H04B 17/0057; H04B 17/0045; H04W 4/005; H04W 52/245
USPC ......... 375/219, 224, 227–228, 259–260, 267, 375/316, 346–347, 349
See application file for complete search history.

(56) References Cited

U.S. PATENT DOCUMENTS

| | | | |
|---|---|---|---|
| 6,141,392 A * | 10/2000 | Hoshikuki et al. ............ | 375/347 |
| 7,403,748 B1 * | 7/2008 | Keskitalo et al. ............. | 455/101 |
| 8,121,537 B2 * | 2/2012 | Hwang et al. ................ | 455/13.3 |
| 8,442,443 B2 * | 5/2013 | Stirling-Gallacher et al. ............................. | 455/63.1 |
| 2003/0162511 A1 * | 8/2003 | Kim et al. ..................... | 455/101 |
| 2004/0053582 A1 * | 3/2004 | Nakanishi et al. ............ | 455/101 |
| 2005/0153673 A1 * | 7/2005 | Ohsuge ......................... | 455/272 |
| 2005/0245224 A1 * | 11/2005 | Kurioka ........................ | 455/272 |
| 2005/0278160 A1 * | 12/2005 | Donnelly et al. .............. | 703/19 |
| 2007/0281654 A1 * | 12/2007 | Choi ........................... | 455/277.1 |
| 2007/0293233 A1 * | 12/2007 | Inoue et al. ................... | 455/450 |
| 2010/0069028 A1 * | 3/2010 | Choi et al. .................... | 455/136 |
| 2010/0290399 A1 * | 11/2010 | Willenegger ................. | 370/328 |

(Continued)

FOREIGN PATENT DOCUMENTS

WO  2012/005494 A2  1/2012

*Primary Examiner* — Jean B Corrielus
(74) *Attorney, Agent, or Firm* — Nelson Mullins Riley & Scarborough LLP (57) ABSTRACT

Provided are a method of receiving downlink data and a machine type communication (MTC) device using the same. The MTC device according to the present invention which has a plurality of antennas includes a reception signal processing module that receives a downlink reference signal for each antenna from a base station, estimates reception signal quality with respect to the downlink reference signal for each antenna, and selects the antenna to receive a downlink signal in accordance with the reception signal quality with respect to each antenna.

14 Claims, 5 Drawing Sheets

(56) References Cited

U.S. PATENT DOCUMENTS

| | | | |
|---|---|---|---|
| 2011/0134987 A1* | 6/2011 | Watanabe | 375/229 |
| 2011/0212747 A1 | 9/2011 | Qin et al. | |
| 2012/0113928 A1* | 5/2012 | Hwang et al. | 370/329 |
| 2013/0136098 A1* | 5/2013 | Li et al. | 370/330 |
| 2013/0251070 A1* | 9/2013 | Gonikberg | 375/329 |
| 2013/0294274 A1* | 11/2013 | Sakai | 370/252 |
| 2014/0086352 A1* | 3/2014 | Ko et al. | 375/267 |

\* cited by examiner

METHOD OF RECEIVING DOWNLINK DATA, AND MACHINE TYPE COMMUNICATION DEVICE USING THE METHOD

CLAIM FOR PRIORITY

This application claims priority to Korean Patent Application No. 10-2012-0072145 filed on Jul. 3, 2012 in the Korean Intellectual Property Office (KIPO), the entire contents of which are hereby incorporated by reference.

BACKGROUND

1. Technical Field

Example embodiments of the present invention relate in general to a method of receiving downlink data and a machine type communication device using the same, and more specifically, to a method of receiving downlink data that receives downlink Machine Type Communications (MTC) data by utilizing antenna switching technology, and an MTC device that uses the same.

2. Related Art

Machine Type Communications (MTC) or machine to machine communications denote a type of data communication that is associated with at least one entity for which human intervention is not necessarily needed. Services optimized for MTC are different from services optimized for human to human communications, and have different characteristics from those of existing user-centric mobile communications in that the services optimized for MTC are associated with characteristics such as a) a variety of market scenarios, b) data communications, c) lower costs and efforts, d) a significantly large number of potential terminals that communicate, e) up to a large range, and f) a significantly small amount of traffic for each terminal.

MTC may be exhibited in the form of various services, and as examples of representative application fields thereof, smart metering, tracking and tracing, remote maintenance and control e-Health, and the like may be given.

In regards to this, in 3rd Generation Partnership Project (3GPP) which is a representative mobile communication standardization institution, MTC standardization for intelligence communications between human and machine and between machine and machine is in progress.

As an MTC-related representative issue that is presently considered in 3GPP Long Term Evolution (LTE), the fact that an MTC device should be manufactured with low costs may be given, and based on this, radio frequency (RF) design and base bandwidth modem design, or the like are taken into account.

In order to design an MTC device with low costs, designing of the MTC device with a narrow bandwidth is representatively considered. A frequency band mainly mentioned is 1.4 MHz to 5 MHz, and setting of the frequency band may be affected by traffic characteristics of application fields where the MTC is applied.

Candidate technology which is most strongly considered when designing an MTC device with low costs and narrow bandwidth is to use a frequency band with a fixed narrow bandwidth for the MTC and a single reception RF transceiver. However, when the MTC device is implemented by the narrow bandwidth device, there is a serious problem in that frequency diversity gain and reception diversity gain are difficult to be acquired, resulting in a reduction in cell coverage. The reduction in cell coverage is a problem that may be generated in both uplink and downlink.

Therefore, there are demands for methods that can maintain the same cell coverage as those of at least existing LTE legacy terminals while implementing an MTC device using the narrow bandwidth.

SUMMARY

Accordingly, example embodiments of the present invention are provided to substantially obviate one or more problems due to limitations and disadvantages of the related art.

Example embodiments of the present invention provide a method of receiving downlink data for a Machine Type Communication (MTC) device.

Example embodiments of the present invention provide an MTC device that uses the method of receiving the downlink data.

In some example embodiments, a method of receiving downlink data of a machine type communication device includes: receiving a downlink reference signal for each antenna from a base station; estimating reception signal quality with respect to the downlink reference signal for each antenna; and selecting the antenna to receive a downlink signal in accordance with the reception signal quality with respect to each antenna. In addition, the MTC device according to an embodiment of the present invention may include a plurality of antennas.

The machine type communication device may use a bandwidth equal to an entire bandwidth used by a network including the base station, or a bandwidth narrower than the entire bandwidth.

The reception signal quality may be determined by at least one of a reference signal received power (RSRP) and a received signal strength indicator (RSSI).

The estimating of the reception signal quality may include estimating the reception signal quality with respect to an entire bandwidth used by the machine type communication device.

The estimating of the reception signal quality may include transmitting, to the base station, a report on a channel state with respect to each of at least one sub-band constituting an entire bandwidth used by the machine type communication device, and estimating reception quality of each sub-band based on the channel state with respect to each of at least one sub-band.

The report on the channel state may include at least one of a channel quality indicator (CQI), a rank indicator (RI), and a precoding matrix indicator (PMI).

The estimating of the reception signal quality may include estimating the reception signal quality with respect to each of at least one sub-band constituting an entire bandwidth used by the machine type communication device.

The selecting of the antenna may include comparing the reception signal quality with respect to each sub-band between the antennas, and selecting the antenna including the largest number of sub-bands with superior reception signal quality.

The method of receiving downlink data may further include receiving machine type communication (MTC) system information through the selected antenna, and demodulating a control channel and a data channel in accordance with the MTC system information.

In other example embodiments, a machine type communication device includes: a reception signal processing module that receives a downlink reference signal for each antenna from a base station, estimates reception signal quality with respect to the downlink reference signal for each antenna, and selects the antenna to receive a downlink signal in accordance with the reception signal quality with respect to each antenna.

The reception signal processing module may include a radio frequency (RF) transceiver that receives an RF signal from one of the plurality of antennas, a switch that performs a switching operation for connecting the selected antenna of the plurality of antennas and the RF transceiver, and an antenna control unit that selects the antenna to receive the downlink signal in accordance with the reception signal quality received from the plurality of antennas, and controls the switch so that the selected antenna and the RF transceiver are connected with each other.

The antenna control unit may determine the reception signal quality by at least one of an RSRP and an RSSI.

The antenna control unit may estimate the reception signal quality with respect to an entire bandwidth used by the machine type communication device to thereby estimate the reception signal quality with respect to the downlink reference signal for each antenna.

The antenna control unit may estimate reception quality of each sub-band based on channel state information with respect to each of at least one sub-band constituting an entire bandwidth used by the machine type communication device.

The antenna control unit may estimate the reception signal quality with respect to each of at least one sub-band constituting an entire bandwidth used by the machine type communication device, and compares the reception signal quality with respect to each sub-band between the antennas to thereby select the antenna including the largest number of sub-bands with superior reception signal quality.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

It should also be noted that in some alternative implementations, operations may be performed out of the sequences depicted in the flowcharts. For example, two operations shown in the drawings to be performed in succession may in fact be executed substantially concurrently or even in reverse of the order shown, depending upon the functionality/acts involved.

While the example embodiments of the present invention and their advantages have been described in detail, it should be understood that various changes, substitutions and alterations may be made herein without departing from the scope of the invention.

The term "terminal" used in the present specification may be designated as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various examples of the terminal may include cellular phones, smart phones with wireless communication function, personal digital assistants (PDA) with wireless communication function, wireless modems, portable computers with wireless communication function, photographing devices such as digital cameras with wireless communication function, gaming devices with wireless communication function, home appliances of storing and playing music with wireless communication function, and Internet home appliances enabling wireless Internet connection and browsing, and portable units or terminals in which combinations of such functions are integrated, but are not limited thereto.

Meanwhile, in order to distinguish from the concept of the terminal mainly used by a user in the present specification, a terminal used in machine type communication services is referred to as a "machine type communication", and a terminal used between users as the general and typical concept other than the machine type communication is referred to as a "user terminal". In addition, the term "machine type communication" will be used as a comprehensive term including a variety of terms used in conjunction regardless of standardization institutions, such as an MTC terminal/device, an M2M terminal/device, and the like.

The term "base station" used in the present specification may denote a fixed location that generally communicates with terminals, and may be referred to as other terms such as a base station, a node-B (Node-B), e node-B (eNode-B), a base transceiver system (BTS), an access point, and the like.

Hereinafter, embodiments will be described in detail referring to accompanying drawings. It should also be noted that throughout the accompanying drawings, the same reference numerals are used to designate the same or similar components, and redundant descriptions thereof are omitted.

The present invention is to solve coverage problems due to the use of a single reception antenna in a Machine Type Communication (MTC) wireless communication system, specifically, in a reception terminal of an MTC device. In the present invention, there is suggested the use of a plurality of antennas in order to overcome problems due to the use of the single antenna, and the present invention relates to wireless antenna reception technology for overcoming coverage problems of the MTC service through efficient operations of the plurality of antennas. Standardization of a narrow bandwidth MTC has proceeded representatively in 3GPP LTE-advanced (Adv.) Rights expression language (Rel)-11.

Figure 1:
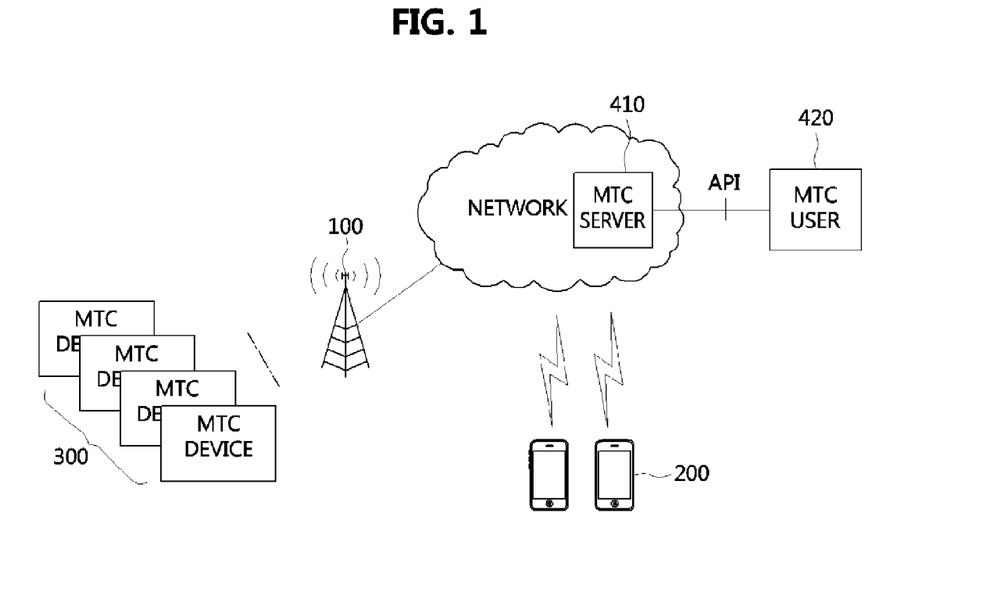
FIG. 1 is a conceptual diagram showing a mobile communication network that provides Machine Type Communication (MTC) services to which the present invention is applied.

FIG. 1 is a conceptual diagram showing a mobile communication network that provides MTC services to which the present invention is applied.

As shown in FIG. 1, the mobile communication network that provides the MTC services includes a base station 100, a user terminal 200, and the like, which are components of the existing mobile communication network, and further includes an MTC server 410 for providing MTC services, an MTC user 420, at least one MTC device 300, and the like.

The MTC device 300 is a terminal with an MTC that has an MTC function of communicating with the MTC server and other MTC devices through a Public Land Mobile Network (PLMN).

The MTC server 410 communicates with the MTC device 300 through the PLMN while communicating with the PLMN. The MTC server 410 also has an accessible interface by the MTC user 420, and provides services for the MTC user 420. The MTC user 420 uses services provided by the MTC server 410.

In the configuration of FIG. 1, the MTC server 410 is controlled by a network operator, the network operator provides an Application Programming Interface (API) on the MTC server, and the MTC user 420 accesses the MTC server of the network operator through the API.

Meanwhile, in FIG. 1, a configuration in which the MTC server is included in the network operator domain is employed, but the MTC server may not be located in the network operator domain, but located outside the network operator domain. In this instance, the MTC server may not be controlled by the network operator domain.

In addition, the MTC device 300 communicates with the MTC server 410 and the like which are located in the network, through the base station 100.

In order to provide MRC services through the mobile communication system described in FIG. 1, seamless interoperability in a wireless connection between the MTC device and the mobile communication system is essential. Therefore, there is a need to look at characteristics of the mobile communication system in conjunction with the MTC device, particularly, bandwidth characteristics.

Figure 2:
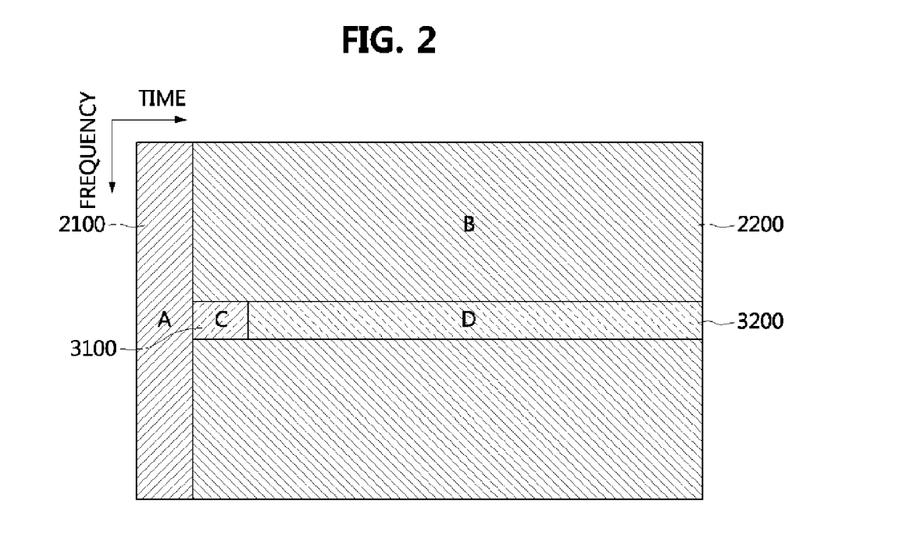
FIG. 2 is a conceptual diagram showing a frequency band used by a base station versus a frequency band used by a narrow bandwidth MTC device.

FIG. 2 is a conceptual diagram showing a frequency band used by a base station versus a frequency band used by a narrow bandwidth MTC device.

In an embodiment of FIG. 2, a frequency band used by a narrow bandwidth MTC device versus a frequency band used by the base station will be described based on a 3GPP LTE system. In FIG. 2, a horizontal axis indicates time and a vertical axis indicates a frequency, and an example in which the base station (eNB) uses a frequency band of 20 MHz in a downlink, and the narrow bandwidth MTC device is operated at a frequency band of 1.4 MHz, is shown.

The LTE system is a cellular mobile communication system based on an orthogonal frequency division multiplexing (OFDM) method, and is designed so as to be constructed, as necessary, no matter when or where frequency resources are available. Therefore, LTE wireless connection may be operated in a wide bandwidth range from 450 MHz at the lowest level to at least 3.5 G at the height level.

The LTE system may also be operated in frequency allocation with a variety of sizes by supporting various transmission bandwidths depending on standard. When the frequency resources are available, broadband transmission is required in order to efficiently provide a significantly high data rate. However, a sufficiently large frequency size is not always available due to limitations in the frequency band to be used or gradual frequency conversion from other wireless connection technology. In this instance, the LTE may be operated at a narrower bandwidth.

In FIG. 2, resource region A 2100 and resource region B 2200 are a time/frequency resource region for a legacy LTE terminal, and resource region C 3100 and resource region D 3200 are a time/frequency resource region for the MTC device.

Resource region A 2100 is a region in which a base station operated at a band of 20 MHz transmits control information with respect to the legacy terminal, and resource region B 2200 is a region in which the base station transmits data with respect to the legacy terminal, that is, a user terminal operated at the same band. Here, resource region A 2100 may include a channel such as a Physical Control Format Indicator Channel (PCFICH) for the legacy terminal, a Physical Hybrid Automatic Repeat Request (HARQ) Indicator Channel (PHICH), a Physical Downlink Control Channel (PDCCH), or the like. In addition, resource region B 2200 may include a Physical Downlink Shared Channel (PDSCH) for the legacy terminal.

Resource region C 3100 is a region that transmits control information with respect to the MTC device operated at a narrow bandwidth of 1.4 MHz, and resource region D 3200 is a region that transmits data with respect to the MTC device operated at the same band. Here, resource region C 3100 may include an MTC-Physical Downlink Control Channel (MTC-PDCCH), an MTC-Physical Control Format Indicator Channel (MTC-PCFICH), and an MTC-Physical HARQ Indicator Channel (MTC-PHICH). Resource region D 3200 includes a Physical Downlink Shared Channel (PDSCH) for the MTC device.

Figure 3A:
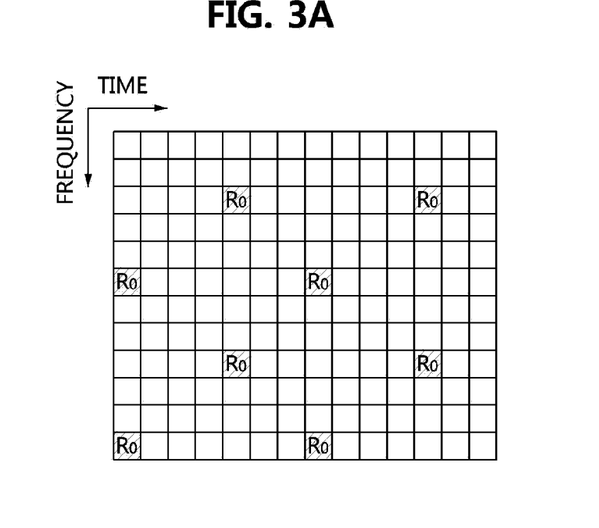
FIGS. 3A and 3B are arrangement plans showing a downlink reference signal (DL-RS) in accordance with the number of antenna ports.
Figure 3B:
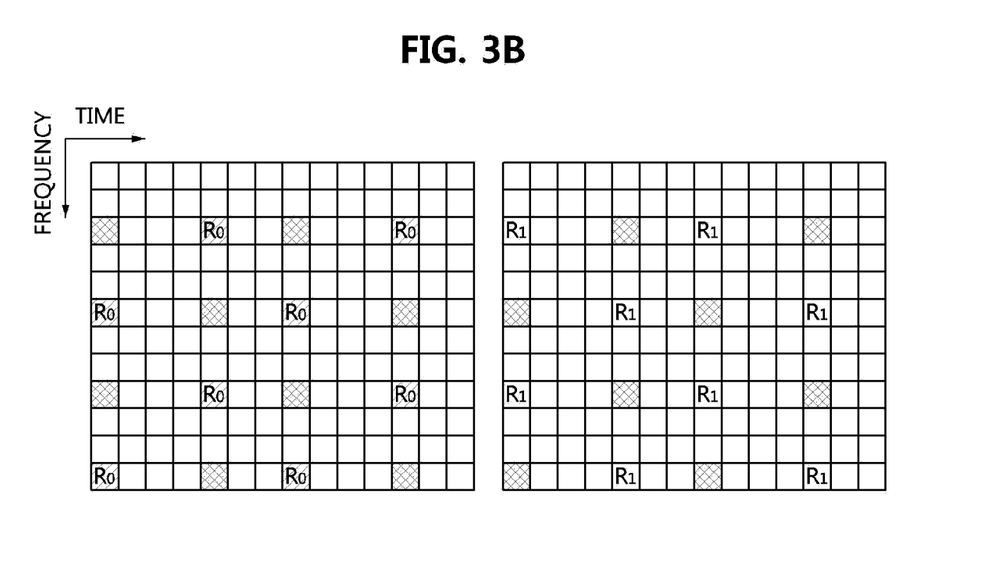

FIGS. 3A and 3B are arrangement plans showing a downlink reference signal (DL-RS) in accordance with the number of antenna ports. FIG. 3A shows a state in which the DL-RS is disposed in a downlink frame structure when the base station has a single antenna, and FIG. 3B shows a state in which the DL-RS is disposed in the downlink frame structure when the base station has two antennas.

In an LTE/LTE-A standard, data channels are assigned in units of resource blocks based on frequency and time. Here, a single subframe (14 symbols) and 12 sub-carriers are referred to as a single resource block (RB), and wireless resources are allocated in a unit of RB. When a data transmission rate of an arbitrary terminal is fast, a plurality of RBs may be used even in a single subframe. For example, 24 or 48 sub-carriers may be used.

$R_0$ in FIGS. 3A and 3B indicates a resource element (RE) in which a reference signal with respect to an antenna port 0 is disposed, and $R_1$ in FIG. 3B indicates an RE in which a reference signal with respect to an antenna port 1 is disposed.

Meanwhile, in an RE in which a reference symbol is transmitted at a specific antenna port, nothing should be transmitted even in other antenna ports, and therefore a reference symbol of a specific antenna port is not interfered by transmission from other antenna ports in a cell. In FIG. 3B, a portion with deviant crease lines is a punctured RE for the this purpose.

FIGS. 3A and 3B show locations of downlink reference signal (DL-RS) symbols which are downlink reference signals in a single resource block of 6 resource blocks in which traffic of the narrow bandwidth MTC device of 1.4 MHz is transmitted. When the existing legacy LTE terminal is taken into account, the same structure as the structure of the existing DL-RS is assumed without assuming a separate DL-RS symbol for the narrow bandwidth MTC device or DL-RS with another structure.

The narrow bandwidth MTC device receives an MTC control channel transmitted to a downlink, and receives control information and traffic data which are included in each channel. In this instance, cell coverage of each channel for the MTC device meets requirements to be the same as cell coverage of the existing legacy LTE terminal. Here, the MTC control channel may include an MTC-Physical Downlink Control Channel (MTC-PDCCH), an MTC-Physical Control Format Indicator Channel (MTC-PCFICH), and an MTC-Physical HARQ Indicator Channel (MTC-PHICH).

As described above, a method mainly mentioned for implementing a low-cost narrow bandwidth MTC device is a single antenna structure in which a reception RF chain is one, and it is difficult to satisfy cell coverage in the single antenna structure.

In the present invention, when the cell coverage, the low cost MTC device, and the like are taken into account in order to solve this problem, an MTC reception unit including a plurality of antenna is used. The MTC reception unit including the plurality of antennas may acquire a diversity gain taking a switching diversity into consideration.

In addition, in the present invention, in order to determine a reception period when performing antenna switching, the antenna switching is performed considering estimation values of reception signal quality-related information usable in a reception terminal, for example, estimation values of RSSI, RSRP, and the like.

Therefore, a switching diversity gain may be obtained through the method according to the present invention, and problems in downlink cell coverage caused by a reception structure of a low-cost narrow bandwidth MTC single antenna may be overcome.

Figure 4:
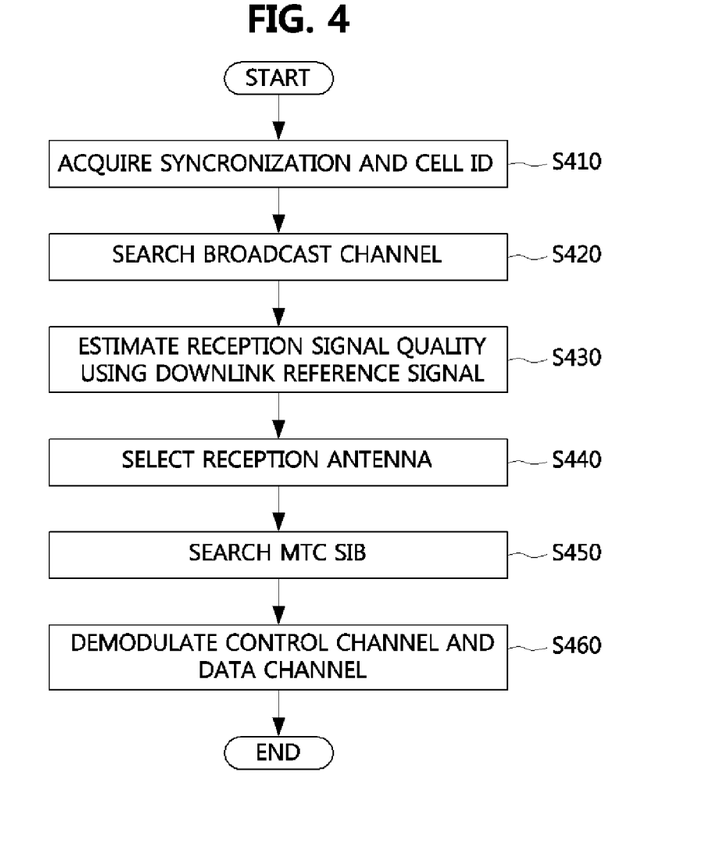
FIG. 4 is a flowchart showing a narrow bandwidth MTC device according to an embodiment of the present invention.

FIG. 4 is a flowchart showing operations of a narrow bandwidth MTC device according to an embodiment of the present invention.

First, in step S410, when an MTC device is turned power-on, a downlink synchronization signal transmitted from a base station is received, and a cell identification (ID) is obtained.

Next, in step S420, the MTC device obtains a Physical Broadcast Channel (PBCH), and receives the most basic information about an involved cell. The operations of steps S410 and S420 are the same as downlink reception operations of the existing legacy LTE terminal.

A general terminal receives a system information block (SIB) after performing the operations of S410 and S420, but the MTC device according to an embodiment of the present invention performs a task of estimating a reception signal quality in advance before receiving SIB information. That is, in step S430, the MTC device receives a downlink reference signal for each antenna, and estimates the reception signal quality using the received reference signal. Here, the reception signal quality according to an embodiment of the present invention is an estimation value of the RSRP or RSSI.

In this instance, quality estimation with respect to the reception signal is performed for each antenna. Here, the MTC device selects an antenna with the most superior reception quality among the reception antennas, that is, an antenna with the largest RSRP estimation value or the largest RSSI estimation value in step S440, and receives an MTC system information block (SIB) including information that is essential to the MTC communication between the base station and the MTC device in step S450. Next, in step S460, the MTC device receives and demodulates a downlink channel and a data channel taking newly updated estimation values into account.

In an MTC communication environment, in general, data transmitted to the downlink does not occupy a larger capacity compared to a transmission amount of the downlink in general data transmission. Consequently, sporadic or periodic data transmission on the downlink is performed, and the MTC device performs measurement that becomes a reference of the antenna switching using the downlink reference signal transmitted from the downlink at a certain period.

Figure 5:
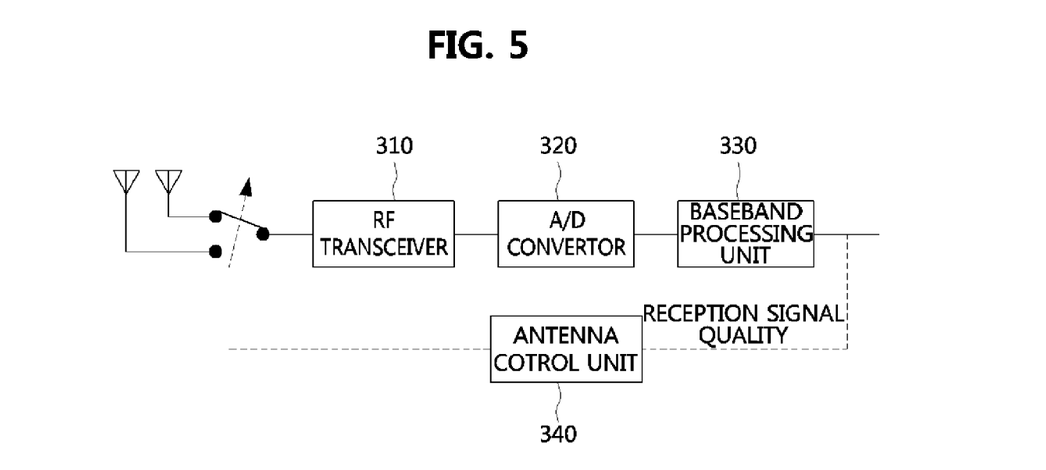
FIG. 5 is a block diagram showing an MTC device according to an embodiment of the present invention.

FIG. 5 is a block diagram showing an MTC device according to an embodiment of the present invention.

As shown in FIG. 5, the MTC device according to an embodiment of the present invention includes a plurality of antennas, but includes a single reception signal processing module.

As shown in FIG. 5, the reception signal processing module may include an RF transceiver 310, an analogue-to-digital (A/D) convertor 320, a baseband processing unit 330, and an antenna control unit 340. Also, a switch in the reception signal processing module performs a switching operation that connects one of the plurality of antennas and the RF transceiver.

The RF transceiver 310 receives an RF signal from one of the plurality of antennas to thereby transmit an extracted analog signal. The A/D convertor 320 converts the analog signal output by the RF transceiver 310 into a digital signal to thereby output the converted signal. The baseband processing unit 330 converts the signal output by the A/D convertor 320 into a baseband, and then calculates an estimation value with respect to reception signal quality.

Here, the following values used as estimation values of the reception signal quality which becomes a reference of the antenna switching may be considered.

Received Signal Strength Indicator (RSSI): including thermal noise as a power of a reception signal and interference components from the adjacent cell Reference Signal Received Power (RSRP): interference components excluding all noise as the power of the reception signal The antenna control unit 340 determines from which antenna a signal will be received based on the estimation value of the reception signal quality output by the baseband processing unit 330, and controls a switching operation for selecting one of at least one antenna. That is, the antenna control unit 340 controls a switch so that the antenna finally selected is connected to the RF transceiver.

Meanwhile, a scheduler of the base station (eNB) allocates resources to the narrow bandwidth MTC device using 1.4 MHz, 3 MHz, or 5 MHz within 6, 15, or 25 resource blocks (RB), and transmits data and control information to at least one MTC device using the allocated resources.

According to LTE release 8 to 10 standards, RSSI and RSRP are measured using the downlink reference signal, and as an example of the downlink reference signal, a cell-specific reference signal (CRS) may be given.

Figure 6:
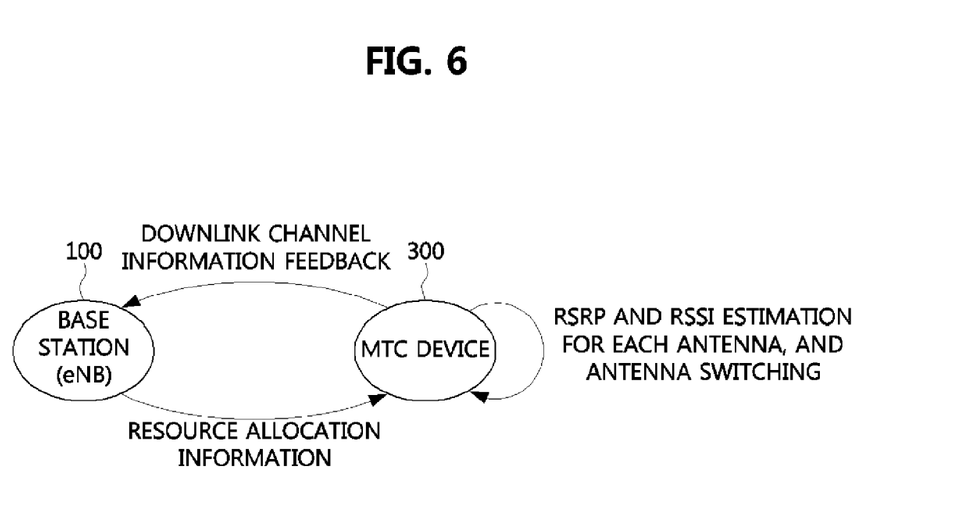
FIG. 6 is a flowchart showing a mutual operation between a base station and an MTC device according to an embodiment of the present invention.

FIG. 6 is a flowchart showing a mutual operation between a base station and an MTC device according to an embodiment of the present invention.

Referring to FIG. 6, the MTC device 300 transmits, to the base station 100, channel feedback information with respect to an entire band or sub-band which is supported by the MTC device 300, in accordance with a configuration of the base station 100. When the system bandwidth is 1.4 MHz (6 RBs) based on the LTE standard, 4 RBs are not divided into separate sub-bands, but when the system bandwidth is 3 MHz or 5 MHz, 4 RBs are defined as a single sub-band unit.

The base station 100 allocates wireless resources based on the downlink channel feedback information transmitted by the MTC device 300, and transmits information about the allocation of the wireless resources to the MTC device 300.

In addition, the MTC device 300 calculates the estimation value of the reception quality for each antenna, and performs antenna switching in accordance with the estimation value of the reception quality. Here, the estimation value of the reception quality may be estimation values of RSSI or an estimation value of RSRP.

According to an embodiment of the present invention, the estimation values of RSSI or RSRP may be average estimation values with respect to an entire band (6, 15, or 25 resource blocks) supported by the MTC device. According to another embodiment of the present invention, the estimation values of RSSI or RSRP may be average estimation values with respect to a sub-band that is a part of the entire band supported by the MTC device.

Figure 7:
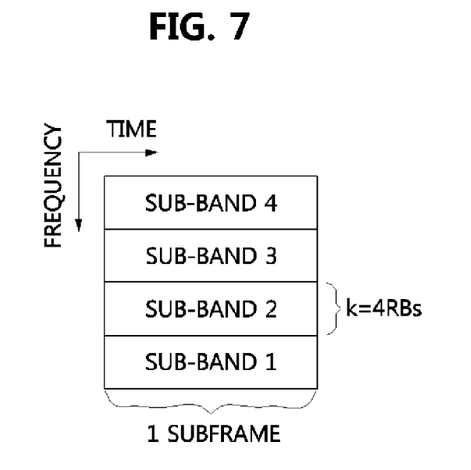
FIG. 7 is a conceptual diagram showing a sub-band in a case in which a system bandwidth supported by an MTC device is divided into sub-bands.

FIG. 7 is a conceptual diagram showing a sub-band in a case in which a system bandwidth supported by an MTC device is divided into sub-bands.

In FIG. 7, when the entire bandwidth supported by the MTC device is 3 MHz (15 RBs), the entire bandwidth may be divided into 4 sub-bands.

Here, the sub-bands 1 to 3 may include 4 RBs, and the sub-band 4 may include 3 RBs. Since the MTC services mainly include uplink data, resource allocation for the downlink data may be expected not to be large.

Therefore, in a case in which the MTC band includes several sub-bands, it is desirable to use the estimation values of RSSI or RSRP for each sub-band. That is, when the MTC device transmits a report on a state of a wireless link for each sub-band to the base station, there is a high possibility that the base station performs the resource allocation based on the estimation values, and therefore states of reception antennas 1 and 2 with respect to RSSI/RSRP corresponding to the sub-band are compared.

In this manner, reception performance may be improved by connecting an antenna that is estimated to have a better channel state of the two reception antennas and a receiver.

Specifically, in FIG. 7, a switching technique using the average estimation values in the sub-band is a switching method in which information fed back to the base station by the MTC device is considered, may implement more accurate antenna switching compared to a method using the estimation values with respect to the entire band, and may be based on feedback with respect to channel information, unlike the method using the estimation values of the entire band.

Figure 8:
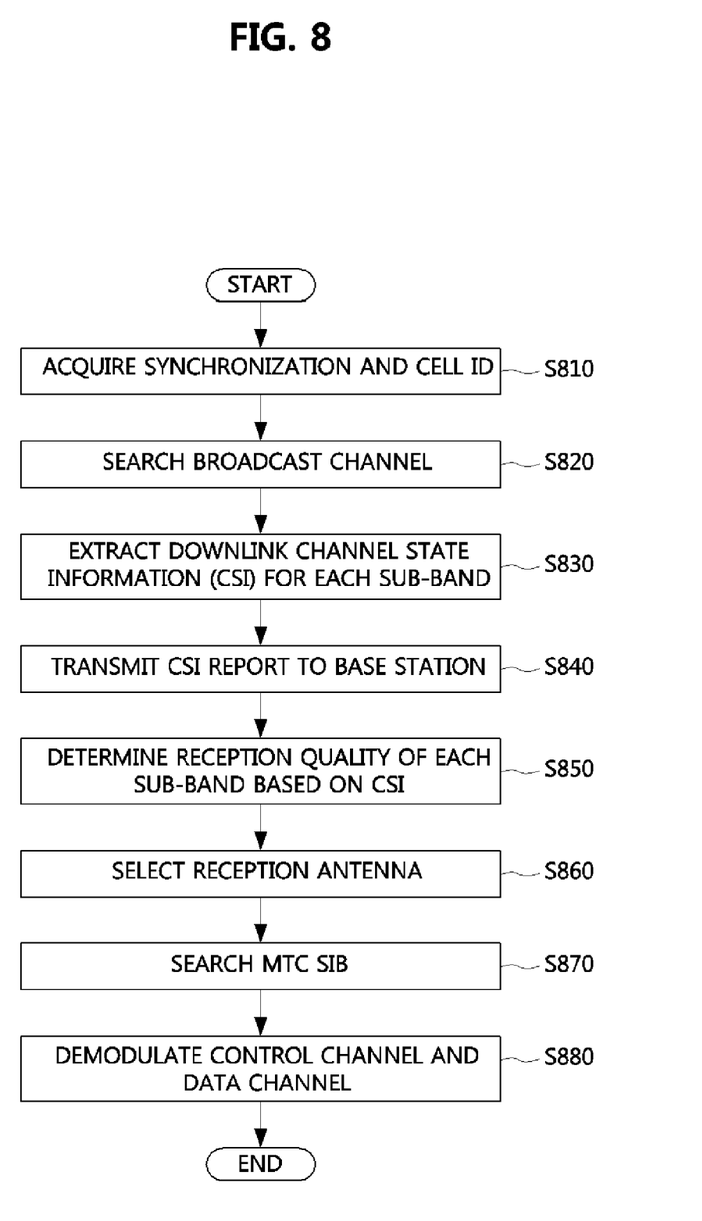
FIG. 8 is a flowchart showing a narrow bandwidth MTC device according to another embodiment of the present invention.

FIG. 8 is a flowchart showing a narrow bandwidth MTC device according to another embodiment of the present invention.

FIG. 8 is a drawing for describing operations of the MTV device in more detail in the method described through FIGS. 6 and 7.

First, in step S810, when the MTC device is turned power-on, a downlink synchronization signal transmitted from the base station is received, and a cell ID is acquired.

Next, in step S820, the MTC device acquires a Physical Broadcast Channel (PBCH) to thereby receive the most basic information about an involved cell. Operations of steps S810 and S820 are the same as reception operations of downlink of the existing legacy LTE terminal.

As described above, in the case of a general user terminal, a System Information Block (SIB) is received after performing the operations of steps S810 and S820, but in the case of the MTC device according to an embodiment of the present invention, a downlink reference signal for each antenna is first received, and downlink channel state information for each sub-band is extracted using the downlink reference signal in step S830. In step S840, the MTC device transmits, to the base station, a report on the extracted channel state information, that is, a report on channel state information (CSI).

The report that is transmitted to a network by the terminal in association with the channel state report is not an explicit report, but is a transmission setting desired to be used when transmitted to the terminal by the base station, and a recommendation of the related parameter. Such a recommendation of the terminal is generally based on a downlink instantaneous channel state. The channel state report may include at least one of a Rank Indicator (RI), a Precoding Matrix Indicator (PMI), and a Channel Quality Indicator (CQI).

In step S850, the MTC device determines the reception quality of each sub-band with reference to CSI. Steps S840 and S850 are sequentially shown for convenience, but the order of the two steps may be reversed, or the two steps may be performed at the same time.

The MTC device selects an antenna based on the estimation values of the reception quality for each sub-band with reference to CSI in step S860, and receives MTC SIB in step S870.

Meanwhile, according to another embodiment of the present invention, a method in which RSSI/RSRP for each sub-band is compared between antennas to thereby select an antenna with a larger number of sub-bands in which each value is large, may be used.

Next, in step S880, the MTC device demodulates a downlink control channel and a data channel taking newly updated estimation values into account.

As described in FIG. 8, when the channel state report of the downlink is used in the antenna switching of the MTC device, the antenna switching may be performed most preferably, in a Time Division Multiplexing (TDD) system in which the downlink and the uplink have the same frequency characteristics.

As above, as a method for obtaining optimal reception performance in an MTC device that has a multi-reception antenna and a single reception RF chain, antenna switching has been suggested through the embodiments of FIGS. 1 to 8.

In the present specification, particularly, estimation values of RSSI/RSRP with respect to the entire band or the sub-band of the MTC device may be calculated, and the calculated values may be used for selecting an antenna. For example, when the system band is 1.4 MHz, a separate sub-band does not exist, and therefore the MTC device calculates the RSSI/RSRP of the entire band with respect to 6 RB, and utilizes the calculated values in the antenna switching.

However, the embodiments of the present invention are not limited thereto, and considering the fact that downlink data for the MTC device is not large, the entire bandwidth is divided into two when the entire bandwidth is 6 RB, and therefore the RSSI/RSRP for each band including 3 RB may be estimated to be used. In the present invention, an embodiment in which 6 RB is divided into a unit of 1 RB or 2 RBs is not excluded.

In addition, even when the system band is 3/5 MHz, an embodiment in which the RSSI/RSRP is measured in units of sub-bands, and an embodiment in which quality estimation of the reception signal is performed in a unit of an 1 RB or 3 RBs may be sufficiently possible.

When selecting an antenna with reference to the estimation values of the reception signal quality with respect to the entire band which the MTC device receives, the estimation values of the reception signal quality for each antenna with respect to the entire band are compared.

However, when comparing the estimation values of the reception signal quality measured in units of sub-bands for each antenna, selecting an antenna with reference to a value of which sub-band is an important issue, and in this case, the antenna may be selected utilizing the two embodiments described above, which may be summarized as below.

First, in a case in which the terminal transmits, to the base station, a CSI report which is channel state information, when the report for each sub-band is transmitted, the RSSI/RSRP of a corresponding sub-band are compared with reference to the value.

Second, the RSSI/RSRP for each sub-band are compared between antennas, and an antenna having the larger number of sub-bands with the higher value is selected.

The MTC device may select and apply one of the two methods and deformable methods from the two methods in accordance with the system band.

According to the embodiments of the present invention described above, a reduction in cell coverage that is a problem in the low-cost narrow bandwidth MTC may be overcome.

In addition, the low-cost MTC device through the single RF transceiver may be satisfied using switching of the reception antenna.

In addition, a switching diversity gain due to antenna switching between a plurality of antennas may be acquired.

While the example embodiments of the present invention and their advantages have been described in detail, it should be understood that various changes, substitutions and alterations may be made herein without departing from the scope of the invention.

What is claimed is:

1. A method of receiving downlink data of a machine type communication device including a plurality of antennas, the method comprising:
   receiving a downlink reference signal for each antenna from a base station;
   estimating reception signal quality with respect to the downlink reference signal for each antenna;
   selecting an antenna to receive a downlink signal in accordance with the reception signal quality with respect to each antenna;
   receiving machine type communication (MTC) system information through the selected antenna; and
   demodulating a control channel and a data channel in accordance with the MTC system information.

2. The method of claim 1, wherein the machine type communication device uses a bandwidth equal to an entire bandwidth used by a network including the base station, or a bandwidth narrower than the entire bandwidth.

3. The method of claim 1, wherein the reception signal quality is determined by at least one of a reference signal received power (RSRP) and a received signal strength indicator (RSSI).

4. The method of claim 1, wherein the estimating of the reception signal quality includes estimating the reception signal quality with respect to an entire bandwidth used by the machine type communication device.

5. The method of claim 1, wherein the estimating of the reception signal quality includes
   transmitting, to the base station, a report on a channel state with respect to each of at least one sub-band constituting an entire bandwidth used by the machine type communication device, and
   estimating reception quality of each sub-band based on the channel state with respect to each of at least one sub-band.

6. The method of claim 5, wherein the report on the channel state includes at least one of a channel quality indicator (CQI), a rank indicator (RI), and a precoding matrix indicator (PMI).

7. The method of claim 1, wherein the estimating of the reception signal quality includes estimating the reception signal quality with respect to each of at least one sub-band constituting an entire bandwidth used by the machine type communication device.

8. The method of claim 7, wherein the selecting of the antenna includes
   comparing the reception signal quality with respect to each sub-band between the antennas, and
   selecting the antenna including the largest number of sub-bands with superior reception signal quality.

9. A machine type communication device that includes a plurality antennas, comprising:
   a processor configured to:
   receive a downlink reference signal for each antenna from a base station,
   estimate reception signal quality with respect to the downlink reference signal for each antenna, select an antenna to receive a downlink signal in accordance with the reception signal quality with respect to each antenna, receive machine type communication (MTC) system information through the selected antenna, and demodulate a control channel and a data channel in accordance with the MTC system information.

10. The machine type communication device of claim 9, wherein the processor is further configured to:

select the antenna to receive the downlink signal in accordance with the reception signal quality received from the plurality of antennas, and control a switch to receive a radio frequency (RF) signal from the selected antenna of the plurality of antennas.

11. The machine type communication device of claim 10, wherein the reception signal quality is determined by at least one of a reference signal received power (RSRP) and a received signal strength indicator (RSSI).

12. The machine type communication device of claim 10, wherein the reception signal quality is estimated with respect to an entire bandwidth used by the machine type communication device to thereby estimate the reception signal quality with respect to the downlink reference signal for each antenna.

13. The machine type communication device with of claim 10, wherein reception quality of each sub-band is estimated based on channel state information with respect to each of at least one sub-band constituting an entire bandwidth used by the machine type communication device.

14. The machine type communication device of claim 10, wherein the reception signal quality is estimated with respect to each of at least one sub-band constituting an entire bandwidth used by the machine type communication device, and the reception signal quality is compared with respect to each sub-band between the antennas to thereby select the antenna including the largest number of sub-bands with superior reception signal quality.

* * * * *